| United States Patent [19] | [11] Patent Number: 4,659,444 |
|---|---|
| Iwata et al. | [45] Date of Patent: Apr. 21, 1987 |

[54] METHOD FOR PRODUCING CARBON FIBER REINFORCED CARBON MATERIAL

[75] Inventors: Kouichi Iwata; Yukinori Yamashita, both of Itami, Japan

[73] Assignee: Sumitomo Electric Industries, Ltd., Osaka, Japan

[21] Appl. No.: 753,049

[22] Filed: Jul. 9, 1985

[30] Foreign Application Priority Data

Jul. 10, 1984 [JP] Japan ................................ 59-143844

[51] Int. Cl.$^4$ .............................................. C25D 1/18
[52] U.S. Cl. .............................. 204/180.9; 204/181.4; 264/29.5
[58] Field of Search .................... 204/180.9, 181.4; 264/29.5

[56] References Cited

U.S. PATENT DOCUMENTS

| 3,562,126 | 2/1971 | Hess | 204/180.9 |
|---|---|---|---|
| 3,658,737 | 4/1972 | Irwin | 204/181.4 |
| 3,660,262 | 5/1972 | Spiller | 204/181.4 |
| 3,945,898 | 3/1976 | Tsuji et al. | 204/181.4 |
| 4,272,346 | 6/1981 | Jakubowski et al. | 204/181.4 |
| 4,510,024 | 4/1985 | Kishida et al. | 204/181.4 |

FOREIGN PATENT DOCUMENTS 1212623 11/1970 United Kingdom ............. 204/180.2

*Primary Examiner*—Terryence Chapman
*Attorney, Agent, or Firm*—Cushman, Darby and Cushman

[57] ABSTRACT

A method for producing carbon fiber reinforced carbon material comprising adhering carbonaceous fine powder to a resinous carrier which can be ionized in a liquid, dispersing the carrier carrying the carbonaceous fine powder in a liquid, placing a carbon fiber substrate and an opposite electrode in the formed dispersion, applying DC voltage between the substrate and the opposite electrode to deposit the carrier carrying the carbonaceous fine powder on the substrate by electrophoresis, heating and/or drying the carbon fiber-carbonaceous fine powder-carrier complex, and calcining the complex to form carbon fiber reinforced carbon material.

8 Claims, No Drawings

METHOD FOR PRODUCING CARBON FIBER REINFORCED CARBON MATERIAL

FIELD OF THE INVENTION

The present invention relates to a method for producing carbon fiber reinforced carbon material (hereinafter referred to as "CFRC"). More particularly, it relates to a method for producing CFRC comprising depositing carbonaceous fine powder on carbon fiber by electrophoresis.

BACKGROUND OF THE INVENTION

CFRC is mainly produced by a chemical vapor deposition (hereinafter referred to as "CVD") method or a liquid phase impregnating method.

The CVD method comprises contacting hydrocarbon gas with a carbon fiber substrate heated to a high temperature under reduced pressure to deposit carbon atoms on the substrate. The liquid phase impregnating method comprises impregnating a matrix material such as a liquid resin or melt pitch in a carbon fiber substrate and calcining the impregnated substrate to carbonize the matrix material Since a volatile component of the matrix is removed from the substrate during calcination so that micropores are formed in the substrate, it is necessary to repeat impregnation and calcination in order to strengthen it.

The CVD method and the liquid phase impregnating method require lengthy complex steps, which is one of the for expensiveness of CFRC. Therefore, CFRC is not widely used except some fields where the cost is not significant, for example, the aerospace industry although it has an excellent properties such as good strength at a high temperature and chemical stability.

Recently, a carbon material not reinforced by the carbon fiber is conveniently produced without using any liquid matrix by directly calcining the carbon powder to carbonize to. Since a heat treated matrix is used, and therefore a total amount of the volatile materials is decreased, the carbon material with high density is advantageously produced. It could be expected that if the carbon powder were calcined together with the carbon fiber substrate, CFRC could be easily produced. However, it is difficult to homogeneously mix the carbon powder with the carbon fiber substrate so that good CFRC cannot be produced.

Instead of directly mixing the carbon powder with the carbon fiber substrate, the carbon powder may be dispersed in a liquid to form a slurry, impregnated in the carbon fiber substrate and then dried. By this slurry method, the impregnated amount of the carbon powder is not controlled, and the powder tends to be eliminated during drying. If a concentration of the slurry is high, a sufficient amount of the slurry is not impregnated in the substrate. If it is low, a sufficient amount of the carbon powder is not contained in the fiber although the slurry easily penetrates in the fiber. Further, the carbon powder is not strongly adhered to the carbon fiber substrate.

SUMMARY OF THE INVENTION

One object of the present invention is to provide an improved method for producing CFRC.

Another object of the present invention is to provide a method for producing CFRC in which matrix carbonaceous powder and a carbon fiber substrate are homogeneously mixed.

Further object of the present invention is to provide a method for producing CFRC in which the matrix carbonaceous powder is irreversibly deposited on the carbon fiber substrate and an amount of the carbonaceous powder to be deposited is easily controlled.

Accordingly, the present invention provides a method for producing CFRC comprising adhering carbonaceous fine powder to a resinous carrier which can be ionized in a liquid, dispersing the carrier carrying the carbonaceous fine powder in a liquid, placing a carbon fiber substrate and an opposite electrode in the formed dispersion, applying DC voltage between the substrate and the opposite electrode to deposit the carrier carrying the carbonaceous fine powder on the substrate by electrophoresis, heating and/or drying the carbon fiber-carbonaceous fine powder-carrier complex, and calcining the complex to form CFRC.

DETAILED DESCRIPTION OF THE INVENTION

According to the method of the present invention, the carbonaceous powder is deposited on the carbon fiber substrate by electrophoresis by utilizing electroconductivity of the latter. To carry out electrophoresis, particles of the carbonaceous powder should be charged, but the carbonaceous particles as such cannot be charged. According to the present invention, the carbonaceous powder is carried on a resinous carrier which can be ionized in a liquid. First group of such resinous carrier includes polycarboxylic acid resins (anionic) and polyamine (cationic), which are used for electrocoating. Second group of such resinous carrier includes thermoset resins which are modified to form electrocoating resins and can be changed to carbonaceous sintered materials by calcination. Examples of the thermoset resin are phenol resin, urea resin, furan resin, epoxy resin, etc. Further, a thermoplastic resin which is modified to a non-melting state is also usable. For example, air oxydated polyacrylonitrile may be used.

The thermoset resins are modified by a per se conventional method to impart electrodeposition properties. For example, phenol resin are modified with an alkid resin to form an anionic resinous carrier in which carboxylic acid groups act as carriers of electrical charge.

Specific examples of the carbonaceous powder are carbon powder, calcined coke powder, graphite powder, etc.

The carbonaceous powder is carried on the carrier by a conventional method, for example, mixing. The amount of the carbonaceous powder to be carried is usually from 0.5 to 20 g, preferably from 1 to 10 g per gram of the carrier.

Together with the carbonaceous powder, additives for promoting sintering of the carbonaceous material and/or ceramic powder (e.g., phosphorice acid, $SiO_2$, $B_2O_3$, $TiO_2$, $B_4C$, $Ca(OH)_2$, $CaCO_3$, $CuSO_4$, $AlCl_3$, $Al(NO_3)_3$, etc ) may be carried on the carrier to improve heat resistance.

The carbonaceous powder carried on the carrier is then dispersed in a liquid such as water and alcoholes in a concentration of 50 to 500 g/liter, preferably 100 to 300 g/liter. The liquid may contain additives, such as dispersant (e.g., nonioinc surfactants, etc).

The carbon fiber may be any of conventional ones, and preferably one produced from polyacrilonitrile (PAN) fiber.

The carbonaceous powder is deposited on the carbon fiber substrate by electrophoresis. In electrophoresis, the carbon fiber substrate acts as an electrode and, as an opposite electrode, a carbon electrode is, for example, used. Conditions of electrodepositions are as follow:

During the electrodeposition, to facilitate the homogeneous deposition, the liquid may be stirred the substrate rate may be rotated or vibrated, and/or the liquid and substrate may be vibrated with supersonic.

Voltage of DC to be applied is usually from 20 to 250 volts, preferably from 30 to 200 volts.

The amount of the carbonaceous powder and the carriere to be electrodeposited is usually from 0.1 to 10 g, preferably from 0.5 to 3 g per gram of the carbon fiber substrate.

The carbon fiber substrate may be of any shape, for example, a woven fabric, a non-woven fabric, paper, a mat, a string, a filament, a tape, a sheet, etc.

After deposition of the carbonaceous powder on the carbon fiber substrate, the composite is dried to remove liquid components. When the thermoset resin is used, drying is carried out under such temperature and time conditions that it does not set.

When the polycarboxylic acid resin or the polyamine resin is used, the composite is heated to decompose or evaporate the resin at a temperature of 300° to 500° C. to produce a carbon fiber-carbonaceous powder composite containing residue of the carrier resin.

When the thermoset resin is used, the composite is heated at a temperature of 150° to 300° C. for 1 to 20 hours to set the resin. In this step, when a two-dimensional substrate such as the fabric, paper or mat is used, the composite may be press formed in a desired shape. In addition, two or more of the two-dimensional composites may be laminated. When the string, filament, tape or sheet form substrate is used, the composite is helically wound or wrapped around a core member and then the resin is set. The core member may have any suitable cross section such as a round or polygonal (e.g. rectangular etc.) cross section.

Then, the carbon fiber-carbonaceous powder composite is calcined at a temperature of 700° to 3,000° C. When pressure is applied on the laminated composite during calcination, a calcined material with higher density is produced than one calcined under atmospheric pressure.

The present invention will be hereinafter explained further in detail by following Examples.

EXAMPLE 1

Self sinterable coke powder is finely ground to produce matrix fine powder with an average particle size of 2 micrometers.

The fine powder (400 g) is homogeneously mixed with acrylamide resin (800 g) and dispersed in a bath liquid (33 liters of water).

A sheet of PAN type carbon fiber woven fabric (length, 20 cm, width 20 cm and thickness, 0.02 cm) is used as a cathode, and a carbon plate is used as an opposite anode. Both electrode are immersed in the bath liquid with a distance of 4 cm. Then, 200 V DC is applied between the electrodes for 10 minutes with stirring the bath liquid.

The thus formed composite is dried at 100° C. for one hours, and then heated at 400° C. for 3 hours to eliminate volatile components.

The heated composite is calcined at 2,000° C. for 2 hours under pressure of 200 kg/cm$^2$.

The thus produced CFRC has flexural strength of 1,000 kg/cm$^2$, which is better than that of CFRC produced by the liquid phase impregnating method.

EXAMPLE 2

Self sinterable carbon powder is finely ground to produce matrix fine powder with an average particle size of 2 micrometers.

The fine powder (2,400 g) is homogeneously mixed with phenol-alkid resin (2,400 g) and dispersed in a bath liquid (33 liters of water)

A sheet of PAN type carbon fiber woven fabric (length, 20 cm, width 20 cm and thickness, 0.02 cm) is used as an anode, and a carbon plate is used as an opposite cathode Both electrode are immersed in the bath liquid with a distance of 4 cm. Then, 50 V DC is applied between the electrodes for 3 minutes with well stirring the bath liquid.

Thus formed composite is washed with water and dried at 80° C. for 30 minutes to form a single plate in which a weight ratio of the carbon powder and the carrier resin to the carbon fiber substrate is 1.5:1.

70 single plates are laminated and pressed at 150° C. under pressure of 150 kg/cm$^2$ for 20 minutes.

Then, the laminate is heated with clamping under 10 kg/cm$^3$ at 170°, 200° or 250° C. each for 4 hours to thermoset it.

The set laminate is calcined by heating to 900° C. at a rate of 10° C./hr. under pressure of 200 kg/cm$^2$ to form CFRC.

Flexural strength of the produced CFRC is 1,100 kg/cm$^2$.

EXAMPLE 3

The same carbon powder as used in Example 2 and acrylamide resin as a carrier are mixed in a weight ratio of 10:1 and dispersed in the same bath liquid as used in Example 2 in a concentration of 145 g/l.

The same carbon fiber fabric and the carbon plate are used as a cathode and an anode, respectively. Electrodeposition is carried out so as to deposit the same amount of the carbon powder carrying carrier as in Example 2.

The deposited material is dried at 80° C. for 30 minutes. 70 sheets of the material are laminated and heated at 350° C. for 4 hours to partially decompose the carrier resin. Then, the laminate is calcined by heating to 900° C. at a rate of 10° C./hr. under pressure of 200 kg/cm$^2$.

The comparison of the laminates produced in Examples 2 and 3 revealed that the former has about 10 % larger density and about 20 % larger flexural strength than the latter.

EXAMPLE 4

In the same manner as in Example 2 but using phenol-furfural resin as the carrier resin, CFRC is produced. Produced CFRC has substantially the same properties as one produced in Example 2.

When phenol-epoxy resin or urea resin is used, CFRC having substantially the same properties is produced.

EXAMPLE 5

The same carbon powder, carrier resin, bath liquid and carbon plate electrode (as a cathode) as used in Example 2 are used.

Electrodeposition is carried out by continuously supplying PAN type carbon fiber filament as an anode with applying 50 V DC for 3 minutes. The deposited filament is washed with water, dried and wound on a winding bobbin.

The filament is then wound on a cylindrical core having a diameter of 50 mm and a length of 20 mm to form a cylindrical article with an outer diameter of 100 mm.

The hollow cylindrical article is detached from the core and set in a mold with an inner diameter of 49 mm and an outer diameter of 101 mm and pressed at 150° C. for 20 minutes with applying pressure of 200 kg/cm$^2$ in a direction parallel with the axis. Then, it is calcined at 2,000° C. in the same manner as in Example 2. The calcined article has a density of 1.6 g/cm$^3$ and flexural strength of 90 MPa.

EXAMPLE 6

In the same manner as in Example 5 but calcining the article at 2,000° C. in an argon atmosphere under atmospheric pressure, the calcined article is produced. It has a density of 1.59 g/cm$^3$ and flexural strength of 65 MPa.

What is claimed is:

1. A method for producing carbon fiber reinforced carbon material comprising:
    adhering self-sinterable carbonaceous fine powder to a resinous carrier which can be ionized in a liquid,
    dispersing the carrier carrying the self-sinterable carbonaceous fine powder in a liquid,
    placing a carbon fiber substrate and an opposite electrode in the formed dispersion,
    applying DC voltage between the substrate and the opposite electrode to deposit the carrier carrying the self-sinterable carbonaceous fine powder on the substrate by electrophoresis,
    heating and/or drying the carbon fiber self-sinterable carbonaceous fine powder-carrier complex, and
    calcining the complex to form carbon fiber reinforced carbon material.

2. A method according to claim 1, wherein the resinous carrier comprises a resin selected from the group consisting of polycarboxylic acid resin and polyamine resin.

3. A method according to claim 2, wherein the carrier is decomposed or removed by heating the complex.

4. A method according to claim 1, wherein the resinous carrier comprises a thermosetting resin or its derivative which is modified as an electrocoating resin.

5. A method according to claim 4, wherein the thermosetting resin is one selected from the group consisting of phenol resin, urea resin, epoxy resin and furan resin.

6. A method according to claim 4, wherein the resin is thermoset by heating the complex.

7. A method according to claim 1, wherein the resinous carrier is a thermoplastic which is modified to a non-melting state.

8. A method according to claim 7, wherein the non-melting state thermoplastic resin is air oxidated polyacrylonitrile.

* * * * *